United States Patent [19]

Schreurs

[11] 4,055,781
[45] Oct. 25, 1977

[54] SPECIAL PURPOSE FLUORESCENT LAMP

[75] Inventor: Willy P. Schreurs, Danvers, Mass.

[73] Assignee: GTE Sylvania Incorporated, Danvers, Mass.

[21] Appl. No.: 504,412

[22] Filed: Sept. 9, 1974

[51] Int. Cl.² .............................................. H01J 1/63
[52] U.S. Cl. ...................................... 313/487; 427/67
[58] Field of Search ............... 117/33.5; 313/109, 486, 313/487; 252/301.4 R; 427/67

[56] References Cited

U.S. PATENT DOCUMENTS

| | | | |
|---|---|---|---|
| 3,339,100 | 8/1967 | Menelly | 117/33.5 L |
| 3,409,792 | 11/1968 | Martyny et al. | 117/33.5 L |
| 3,548,237 | 12/1970 | Schreurs | 117/33.5 L |
| 3,748,517 | 7/1973 | Haft | 313/487 |
| 3,825,792 | 7/1974 | Rokosz et al. | 117/33.5 L |
| 3,858,082 | 12/1974 | Thornton | 313/487 |
| 3,875,453 | 4/1975 | Thornton | 313/487 |

Primary Examiner—Ralph Husack
Attorney, Agent, or Firm—James Theodosopoulos

[57] ABSTRACT

A fluorescent lamp which enhances the colors blue and red while maintaining an acceptable overall color rendition contains a four component phosphor blend comprising three broad band emitting phosphors and a narrow band emitting phosphor which peaks in the deep red region of the visible spectrum.

1 Claim, 3 Drawing Figures

FIG. 2

SPECIAL PURPOSE FLUORESCENT LAMP

BACKGROUND OF THE INVENTION

The use of plant growth promoting fluorescent lamps for the illumination of tropical fish has gained wide acceptance due to the vivid color enhancement of red and blue colored fish. However, these lamps emit insufficinet energy in the 520 to 590 nanometer band and their overall color rendition makes them unsuitable for the illumination of marine tropical fish which exhibit a greater variety of colors and particularly some bright yellows. In addition to color enhancement, it is also desirable to provide an illumination source which would stimulate the growth of life sustaining brown, red and green algae for these seawater tropical fish.

DESCRIPTION OF THE PREFERRED EMBODIMENT

Figure 1:
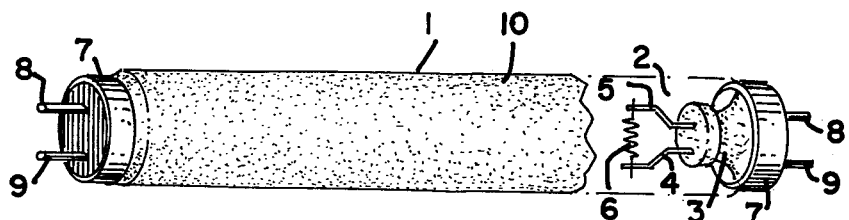
FIG. 1 is a view of a fluorescent lamp.

In FIG. 1, lamp 1 has an elongated tubular glass envelope 2, which is sealed at each end by a glass stem 3, through which lead-in wires 4,5 extend to support a filament 6 of coiled tungsten wire. The filement can be a doubly or triply-coiled filament of the usual type, or a suitable filament of some other type, and will carry the usual electron-emitting coating of alkaline earth oxide, generally containing also a small amount of zirconium dioxide as is now known in the art. The envelope contains a filling of inert gas at low pressure, for example, a pressure of about 2 mm of mercury, and a small quantity of mercury, so that the lamp can be operated at a mercury vapor pressure of between 2 and 10 microns, for example. The usual base 7, from which the contact prongs 8, 9 extend in an insulated manner is cemented to each end of the lamp as is customary.

The lamp has a coating 10 of powdered phosphor, applied in the customary manner to the interior surface of the glass envelope. Although any suitable phosphors which will give the desired light emission can be used, I have found that a mixture of antimony activated calcium fluorophosphate, lead activated calcium tunstate, tin activated strontium mangesium orthophosphate and manganese activated magnesium fluogermanate is very effective. The blue emitters, that is, the antimony activated calcium fluorophosphate and the lead activated calcium tungstate, should together comprise about 40 to 60 weight percent of the mixture, preferably about 50%, and the narrow band red emitter, that is, the manganese activated magnesium fluogermanate, should comprise about 10 to 30 weight percent of the mixture, preferably about 20%.

In order to achieve the desired characteristics of lamp chromaticity and color rendition, a blend of phosphor is prepared by mixing 160 g of light blue emitting calcium fluorophosphate activated by antimony, 40 g of deep blue emitting lead activated calcium tungstate, 120 g of orange emitting strontium magnesium orthophosphate activated by tin and 80 g of deep red emitting manganese activated magnesium fluogermanate.

Fluorescent lamps are coated with the phsophor blend and processed by methods well known in the art. The chromaticity of the resulting lamps is calculated from their spectral energy distribution and is represented by point B in FIG. 2.

Figure 2:
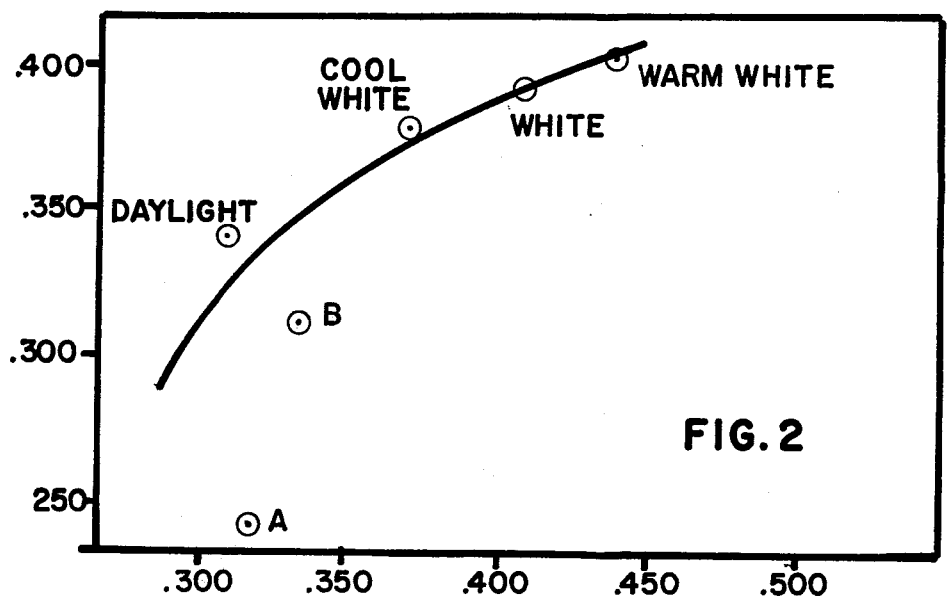
FIG. 2 is a plot of the color coordinates of various fluorescent lamps.

The curve in FIG. 2 is in the locus of black body emitters and, for comparison purposes, the figure shows the color coordinates of various commercial fluorescent lamps, namely, warm white, white, coal white and daylight. The figure also shows the chromaticity, point A, of a typical plant growth lamp previously used for the illumination of tropical fish. It can be seen that both points A and B are in the so-called purple region of the C.I.E. chromaticity chart, that is, below the black body locus.

Figure 3:
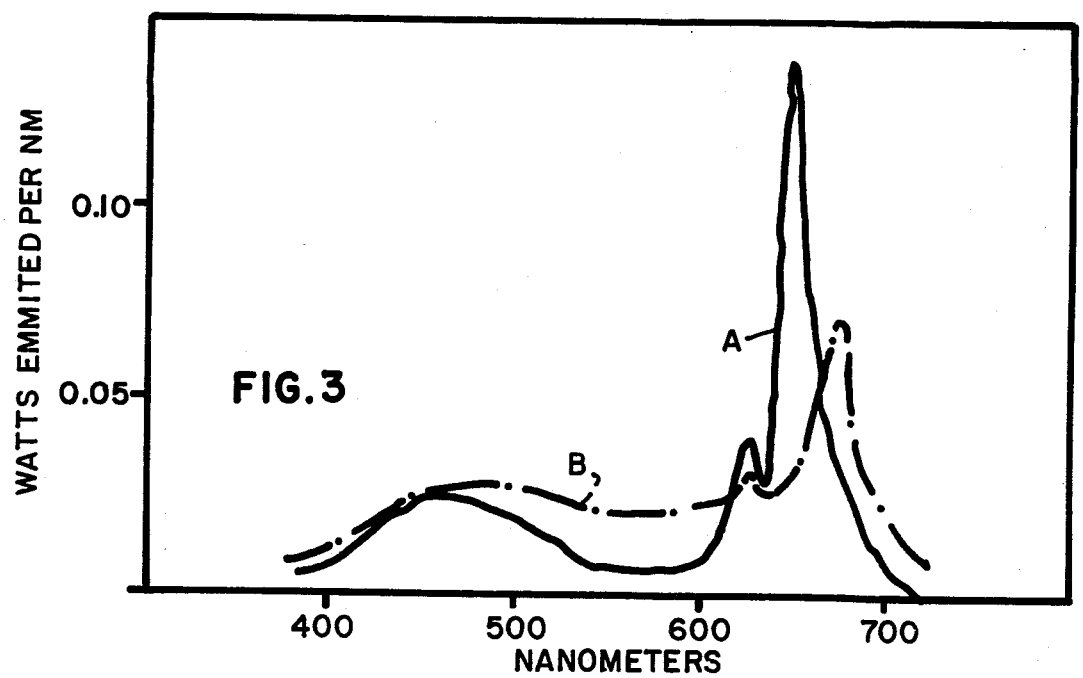
FIG. 3 shows the spectral energy distribution curves for a lamp in accordance with this invention and a commercial plant-growth lamp.

From the spectral energy distribution curve of a lamp in accordance with this invention, represented as B in FIG. 3, it is possible to calculate the respective energies in the blue, green and red regions of the visible spectrum and compare the values so obtained with those of a commercial plant-growth lamp represented as A in FIG. 3.

Defining the blue energy as that which is represented by the area under these curves between 400 and 470 nanometers, the green-yellow between 520 and 590 and the red between 640 and 700, it is possible to express a relative value of color rendition for these respective lamps.

Such a comparison is given in the table below.

|  | A | B |
|---|---|---|
| Blue energy | 1.24 watts | 1.38 watts |
| Green-yellow energy | 0.54 watts | 1.55 watts |
| Red energy | 2.74 watts | 2.04 watts |

The lamp according to the invention emits three times more green-yellow energy while maintaining sufficient red and blue emissions for the enhancement of these colors.

I claim:
1. A fluorescent lamp comprising an envelope filled with an inert gas at low pressure, a filament within said envelope carrying an electron emitting coating of alkaline earth oxide and a coating of four blended phosphors disposed on the interior surface of said envelope, said coating comprising two broad band blue emitters, one broad band orange emitter and a single narrow band emitter peaking in the deep red region of the visible spectrum, said blue emitters being lead activated calcium tungstate and antimony activated calcium fluorophosphate and comprising between 40 to 60 weight percent of the total phosphor weight, said red emitting phosphor being manganese activated magnesium fluogermanate and comprisng between 10 and 30 weight percent of the total phosphor weight, said orange emitting phosphor being tin activated strontium magnesium orthophosphate, the chromaticity of said lamp being in the purple region of the C.I.E. chromaticity chart.

* * * * *